UNITED STATES PATENT OFFICE.

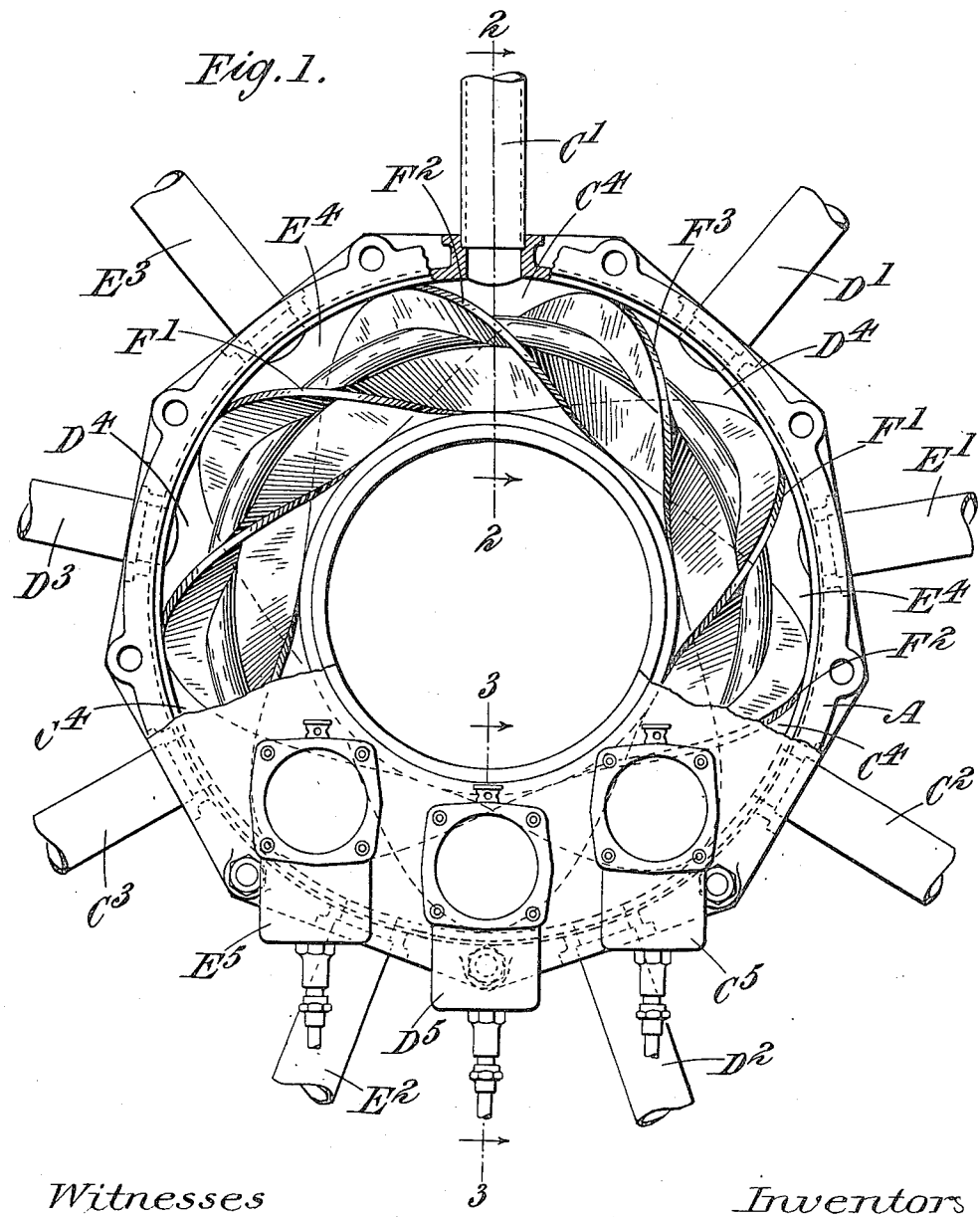

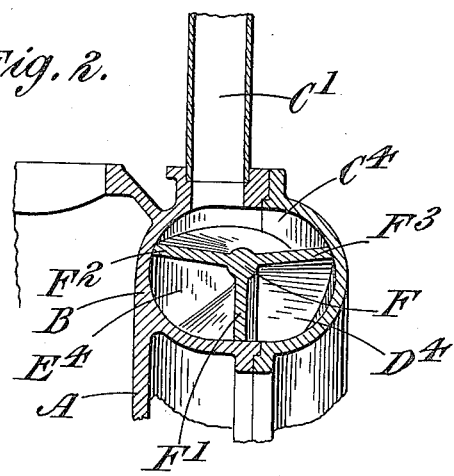
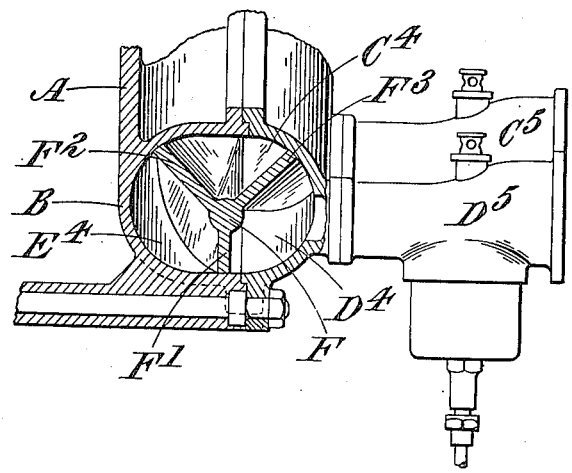

ALFRED HUBERT ROY FEDDEN, OF FISHPONDS, AND LEONARD FREDERICK GEORGE BUTLER, OF ST. ANDREWS PARK, BRISTOL, ENGLAND.

INDUCTION-PIPE FOR RADIAL OR ROTARY INTERNAL-COMBUSTION ENGINES.

1,323,685.  Specification of Letters Patent.  Patented Dec. 2, 1919.

Application filed November 21, 1918. Serial No. 263,579.

*To all whom it may concern:*

Be it known that we, ALFRED HUBERT ROY FEDDEN and LEONARD FREDERICK GEORGE BUTLER, subjects of the King of England, residing at Fishponds, Bristol, England, and St. Andrews Park, Bristol, England, respectively, have invented certain new and useful Improvements in Induction-Pipes for Radial or Rotary Internal-Combustion Engines, of which the following is a specification.

This invention is for improvements in or relating to induction pipes for radial or rotary internal-combustion engines and has for its object to provide such a system or plurality of induction-pipes that the distribution of the mixture to the various cylinders is uniform and simple. The principal difficulty which has existed heretofore with regard to induction is the overlapping of the induction periods of different cylinders drawing their charges from a single induction-pipe or carbureter, as a uniform distribution can not under such circumstances be maintained.

If the cylinders of a radial or rotary engine are considered as divided into groups, each group is, according to this invention, supplied by a separate induction-pipe or conduit, the cylinders comprising a group being those which are so spaced apart angularly around the crank-shaft, or so "timed", that in the preferred form of this invention the induction-periods of their operation do not overlap. Consequently an induction-pipe supplies at any instant only one cylinder and the composition and distribution of the mixture is therefore more uniform than is usually obtained. The invention is also applicable to cases in which overlapping of the induction periods remains in the engine to which the invention is applied; for even though there is overlapping in such a case it is reduced to so small a degree as not to be detrimental to the uniform distribution of the mixture to any material extent. Other features of the invention are hereinafter fully described and illustrated and the novel details pointed out in the claims.

In the accompanying drawings, which illustrate one embodiment of this invention, Figure 1 is a front elevation partly in section of the induction-system according to this invention, for a nine-cylinder engine.

Fig. 2 is a part section on the line 2, 2 of Fig. 1, and

Fig. 3 is a part section on the line 3, 3 of Fig. 1.

Like reference characters indicate like parts throughout the drawings.

Referring to the construction illustrated in the drawings, the crank-case A is provided with an annular chamber B formed in any convenient manner, as by casting. A number of pipes or conduits are arranged radially thereto to provide communication between the chamber B and each of the cylinders. These conduits are designated respectively $C^1$ $D^1$ $E^1$ $C^2$ $D^2$ $E^2$ $C^3$ $D^3$ and $E^3$ and these letters will be used to denote both the conduits and the cylinders with which they communicate.

Within the annular chamber B there is mounted a central core F having three vanes or webs $F^1$ $F^2$ $F^3$ radiating therefrom to divide the chamber B into three chambers $C^4$ $D^4$ $E^4$ as shown clearly in Figs. 2 and 3, and these vanes are moreover arranged helically around the core F. It will be seen therefore that the three chambers are themselves helical and the pitch of the helix is so chosen that each chamber communicates with three of the radial conduits, these three being equally spaced apart angularly around the chamber B, or in other words around the engine crank-shaft. Thus the chamber $C^4$ feeds the cylinders $C^1$ $C^2$ $C^3$, the chamber $D^4$ feeds the cylinders $D^1$ $D^2$ $D^3$ and the chamber $E^4$ feeds the cylinders $E^1$ $E^2$ $E^3$. The chambers $C^4$ $D^4$ $E^4$ are themselves supplied from carbureters $C^5$ $D^5$ $E^5$ respectively, connected to them as shown in Fig. 3 at any convenient point. Obviously a single triplex carbureter could be used instead of three single carbureters, if so desired.

Now, it is well known that it is desirable in a radial or rotary internal-combustion engine that the order of firing should not be by immediately-successive cylinders and in the engine above referred to, the order is therefore $C^1$ $E^1$ $D^2$ $C^3$ $E^3$ $D^1$ $C^2$ $E^2$ $D^3$. From this it will be seen that when any one cylinder fires, (say $C^1$) the next cylinder of that group which will fire is 240° away (*i. e.*, $C^3$, $C^2$ successively). The induction strokes of the cylinders are of course separated by the same angle, i. e. from the commencement of induction through conduit $C^1$ to the commencement of induction through $C^2$ is 240° or two-thirds of a revolution of the crank-shaft. This is sufficient to insure that the induction will be completed for the first cylinder, before it commences for the next, and a regular uniform distribution of the mixture is thereby insured. The same action takes place with each of chambers $C^4$ $D^4$ $E^4$ with respect to the corresponding groups of cylinders.

The annular construction of the chambers $C^4$ $D^4$ $E^4$ offers a special advantage in that there are always provided two paths from a carbureter to any cylinder and this tends to prevent irregularities which would arise if there were complete reversal of flow of the mixture. Thus, consider the carbureter $C^5$ supplying the cylinder $C^1$ through the conduit $C^4$. The mixture entering conduit $C^4$ flows in one direction past the conduit $C^2$ and in the other direction past the conduit $C^3$ to the conduit $C^1$. At or shortly after the end of the induction period for $C^1$, induction to $C^3$ commences. A portion of the mixture is already flowing from the carbureter toward $C^3$, and the portion flowing in the other direction past $C^2$ has merely to continue past $C^1$ to complete the circle and pass into the conduit $C^3$. A complete reversal of flow is obtained only in that portion of the conduit $C^4$ between the cylinders $C^3$ and $C^1$. Moreover, it will be appreciated that the provision of two paths between the carbureter and any cylinder is equivalent to an increase in the effective area of the induction-pipe or conduit.

Further, it will be appreciated that the helical arrangement of the induction-conduits tends to prevent any deposition of fuel from the mixture by reason of the swirling action set up, and also because the swirling is uniform throughout the conduit.

The construction described above is one that is considered desirable, as it is comparatively simple to manufacture, for it is not necessary that the chamber B should be solid with the crank-case or that the vanes $F^1$ $F^2$ $F^3$ should make a gas-tight joint at the walls of the chamber B. It is obvious, however, that other methods of manufacture could be used without departing from the spirit of this invention. Thus, for example, three separate pipes could be twisted together in a spiral like the three conduits $C^4$ $D^4$ $E^4$; or again, if it is not necessary that all the pipes $C^1$ $D^1$ $E^1$ should be in the same vertical plane, three annular pipes arranged side by side could be used and the connecting pipes to the cylinders suitably inclined to connect with the appropriate annular pipe.

A special advantage of the invention hereinbefore described is the simplification which is rendered possible in the carbureter controlling attachments, since any type of carbureter may be used and it may be placed in any convenient position.

This invention may be applied to engines having a number of cylinders other than nine, say for instance six, or twelve, by arranging for a suitable number of groups of three cylinders; moreover, it is not necessarily confined to numbers which are multiples of three although in practice this will usually be found to be most efficient. Each cylinder has to draw in a charge in each two revolutions of the engine, or 720°, and the number of cylinders in a group is determined by the angular extent of the induction period since the prime condition is that these shall not overlap, or that overlap shall be minimized. If this period could be reduced to 180°, then four cylinders could be put in each group or even two in for example a 4-cylinder two-stroke engine, but, as stated above, it is found in practice that three is the most efficient number.

What we claim as our invention and desire to secure by Letters Patent:—

1. For a multi-cylinder internal combustion engine having the cylinders divided into groups with the cylinders in each group so arranged that the induction periods of the various cylinders of each group have the overlap minimized, a separate induction conduit for each group, said conduits being arranged spirally around one another.

2. For a multi-cylinder internal-combustion engine having the cylinders divided into groups with the cylinders in each group so arranged that the induction periods of the various cylinders of each group have the overlap minimized, a separate induction conduit for each group, said conduits being arranged spirally around one another in annular form.

3. For a multi-cylinder internal-combustion engine having the cylinders divided into groups with the cylinders in each group so arranged that the induction periods of the various cylinders of each group have the overlap minimized, an annular chamber having a spiral vane therein dividing the chamber into two conduits, each of which constitutes an induction conduit, means to connect each conduit with one of the groups of cylinders, and means to connect each conduit to a source of fuel supply.

4. For a multi-cylinder internal-combustion engine having the cylinders divided into groups with the cylinders in each group so arranged that the induction periods of the various cylinders of each group have the overlap minimized, an annular chamber having therein a plurality of spiral vanes dividing the chamber into as many spiral conduits as there are groups of cylinders, means to connect each of said conduits with one of said groups of cylinders, and means to connect each of said conduits with a source of fuel supply.

5. For a multi-cylinder internal-combustion engine having the cylinders divided into groups with the cylinders in each group so arranged that the induction periods of the various cylinders of each group have the overlap minimized, an annular chamber having therein a spiral vane dividing the chamber into two conduits each of which constitutes an induction conduit, means to connect each conduit with one of the groups of cylinders, means to connect each conduit with a source of fuel supply, and an annular strengthening core within said spiral chamber.

6. For a multi-cylinder internal-combustion engine having the cylinders divided into groups with the cylinders in each group so arranged that the induction periods of the various cylinders of each group have the overlap minimized, an annular chamber having therein a plurality of spiral vanes dividing said chamber into as many spiral conduits as there are groups of cylinders, means to connect each conduit with a source of fuel supply, and an annular strengthening core within said annular chamber.

In testimony whereof we have signed our names to this specification in the presence of two subscribing witnesses.

ALFRED HUBERT ROY FEDDEN.
LEONARD FREDERICK GEORGE BUTLER.

Witnesses:
E. TYLER,
A. E. LONG.